(12) United States Patent
Pruss et al.

(10) Patent No.: US 9,838,294 B2
(45) Date of Patent: *Dec. 5, 2017

(54) NETWORK DEVELOPMENT AND TESTING AS A CLOUD SERVICE

(71) Applicant: Cisco Technology, Inc., San Jose, CA (US)

(72) Inventors: Richard Pruss, Brisbane (AU); John E. McDowall, Redwood City, CA (US); David John Beazley, Roseville (AU); Marc Joseph Faggion, Bexley (AU); Joel Obstfeld, Bushey (GB)

(73) Assignee: Cisco Technology, Inc., San Jose, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/863,761

(22) Filed: Sep. 24, 2015

(65) Prior Publication Data
US 2016/0014012 A1 Jan. 14, 2016

Related U.S. Application Data

(63) Continuation of application No. 13/946,257, filed on Jul. 19, 2013, now Pat. No. 9,183,121.

(51) Int. Cl.
*G06F 9/44* (2006.01)
*H04L 12/26* (2006.01)
(Continued)

(52) U.S. Cl.
CPC .......... *H04L 43/50* (2013.01); *G06F 9/45558* (2013.01); *G06F 11/3664* (2013.01);
(Continued)

(58) Field of Classification Search
CPC ..... H04L 41/0806; H04L 41/12; H04L 43/50; G06F 11/3664; G06F 11/3668; G06F 9/45558; G06F 2009/45591
(Continued)

(56) References Cited

U.S. PATENT DOCUMENTS 7,356,679 B1 4/2008 Le et al.
8,549,513 B2 10/2013 Vinberg et al.
(Continued)

OTHER PUBLICATIONS

MININET, "An Instant Virtual Network on your Laptop (or other PC)," retrieved from http://mininet.org/, on Jun. 26, 2013, 19 pages.
(Continued)

*Primary Examiner* — Ted T Vo
(74) *Attorney, Agent, or Firm* — Edell, Shapiro & Finnan, LLC (57) ABSTRACT

Presented herein are techniques to receive configuration instructions for elements of a network topology to be simulated and tested. In response to receiving and in accordance with the configuration instructions, a plurality of software images (for a plurality of virtual network elements of the network topology) are configured via an Application Programming Interface (API). The plurality of software images run in a cloud host. In response to receiving and in accordance with the configuration instructions, data is configured via the API, which represents one or more connections between the virtual network elements. A plurality of software images for the plurality of virtual network elements is then executed in accordance with the data representing the connections, for development and testing of the network topology.

20 Claims, 8 Drawing Sheets

(51) Int. Cl.
G06F 11/36 (2006.01)
H04L 12/24 (2006.01)
G06F 9/455 (2006.01)

(52) U.S. Cl.
CPC ...... *G06F 11/3668* (2013.01); *H04L 41/0806* (2013.01); *H04L 41/12* (2013.01); *G06F 2009/45591* (2013.01)

(58) Field of Classification Search
USPC .................................. 717/121, 131, 134–135
See application file for complete search history.

(56) References Cited

U.S. PATENT DOCUMENTS 9,183,121 B2 * 11/2015 Pruss ................. G06F 11/3668
2015/0026667 A1 1/2015 Pruss et al.

OTHER PUBLICATIONS

Bacor, "Cloud-based Network Simulator for Next Generation Wireless Technology (WiMAX and LTE)," Master of Information Technology thesis, Oct. 2011, 113 pages.

Jesus et al., "Build your own cloud sandbox, Part 1: Installing an IBM Workload Deployer virtual appliance", Jan. 2013, http://www.ibm.com/developerworks/websphere/library/techarticles/1212_dejesus/1212_dejesus.html, retrieved from https://web.archive.org/web/20130122053255/, 15 pages.

Virtualization Special Interest Group PCI Security Standards Council, "Information Supplement: PCI DSS Virtualization Guidelines", Jun. 2011 , retrieved from https://www.pcisecuritystandards.org/documentsNirtualization_InfoSupp_v2.pdf, 39 pages.

Webopedia, "API", Jan. 2012, http://www.webopedia.com/TERM/A/API.html, retrieved from https://web.archive.org/web/20120104132528/, 1 page.

* cited by examiner

NETWORK DEVELOPMENT AND TESTING AS A CLOUD SERVICE

CROSS REFERENCE TO RELATED APPLICATION

This application is a continuation of U.S. application Ser. No. 13/946,257, filed Jul. 19, 2013, the entirety of which is incorporated herein by reference.

TECHNICAL FIELD

The present disclosure relates to network development and testing.

BACKGROUND

Software Development Kits (SDKs) are a set of software tools that enable developers to access, extend or customize certain software applications, such as those utilized by network routers and switches. Network developers using a SDK need the ability to test these software applications, either on physical or software (virtual) routers and switches.

Currently, virtual routers and switch simulations are limited to process simulations, which do not execute software that is directly deployable on a physical router and switch. Further, such process simulations are typically configured via static configuration files. In order to modify the topology of a test network, the entire topology must be taken down in order to update the configuration files.

DESCRIPTION OF EXAMPLE EMBODIMENTS

Overview

Presented herein are techniques to receive configuration instructions for elements of a network topology to be simulated and tested. In response to receiving and in accordance with the configuration instructions, a plurality of software images (for a plurality of virtual network elements of the network topology) are configured via an Application Programming Interface (API). The plurality of software images run in a cloud. In response to receiving and in accordance with the configuration instructions, data, which represents one or more connections between the virtual network elements, is configured via the API. A plurality of software images for the plurality of virtual network elements are then executed in accordance with the data representing the connections, for development and testing of the network topology.

Example Embodiments

Figure 1:
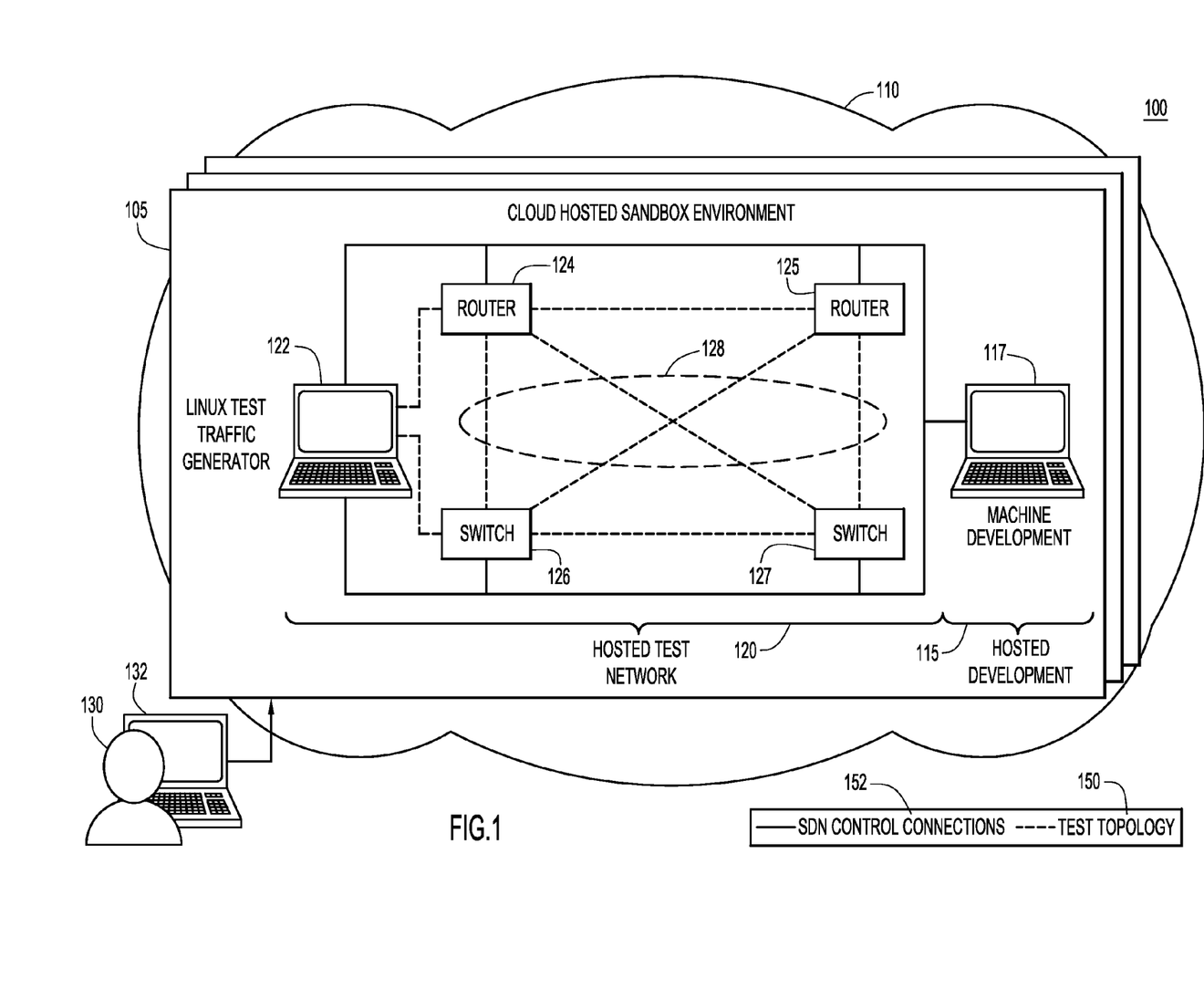
FIG. 1 is a block diagram of a network development and testing environment accessible to a network developer according to the techniques presented herein.

Referring first to FIG. 1, a system 100 for a cloud hosted sandbox environment 105 is shown. The network development and testing environment is hosted in a cloud shown at reference numeral 110. The cloud hosted sandbox environment 105 includes a hosted development portion 115 and a hosted test network portion 120. The hosted development portion 115 includes software to serve as (or emulate) a development machine 117. The hosted test network portion 120 includes software to serve as (or emulate) a test pattern generator 122 and software that emulates various network elements, for example, routers 124 and 125, and switches 126 and 127, as well as connections between the network elements, as collectively shown at reference numeral 128.

A network developer (i.e., user) is shown at reference numeral 130 and uses an endpoint 132, such as desktop, laptop, tablet computer, mobile phone, to access the cloud hosted sandbox environment 105.

The network or cloud 110 may consist of one or more wired and/or wireless local and/or wide area networks. The hosted development portion 115 and hosted test network portion 120 are depicted as being hosted in a network or cloud 110, although it would be possible to execute the development portion 115 and test network portion 120 outside of a network environment, and solely on an endpoint device, e.g., endpoint device 132. The user 130 may access and/or log into development machine 117. The development machine 117 may interface with hosted test network portion 120. The test traffic generator 120 may embodied as software running on the development machine 117 or endpoint device 132.

In one embodiment, the software used for the virtual network elements of the hosted test network portion 120 may be actual deployable software used for software-virtualized network devices that are commercially available, subject to licensing fees and restrictions. In addition, the software used for the virtual network elements of the hosted test network portion 120 may be deployable software used in physical network elements, also commercially available subject to licensing fees and restrictions. In using software of this type for the network elements in the hosted test network portion, it is ensured that the test network identically matches a real-world physical or virtual network topology.

As shown in FIG. 1, the hosted development portion 115 and hosted test network portion 120 may be hosted within cloud hosted sandbox environment 105. A "sandbox" is a software development entity that allows a network developer to isolate untested or suspect code from "live" production environments. A sandbox replicates the functionality of a production environment, at least to the extent that accurate testing may occur. In using a sandbox, production environments are protected from damage that may occur from network elements that have not yet completed development and testing.

Another advantage of a sandbox relates to protection of intellectual property. Commonly, SDKs that may include test environments are made available for free by vendors. If the software for the network elements emulated in the test environment were supplied to a network developer 130, the developer could potentially use that software to build a real-world virtual network, making use of virtual routers and switches and associated libraries without having to pay any licensing fees. A sandbox environment allows a plurality of potentially separately licensable features such as libraries and virtual routers and switches to be bundled together for use in a cloud (and without the need to be released into the possession of developers). This reduces unauthorized use of the software for the virtual network elements.

FIG. 1 shows that the connections 128 between the network elements form a test topology, shown at reference numeral 150. There also are Software Defined Networking (SDN) control connections 152 among the development machine 114, the test pattern generator 122 and the network elements 124-127.

The test traffic generator 122 may generate test network traffic to be supplied to the hosted test network. The SDN connections 152 may be represented/implemented as Application Programming Interfaces (APIs), as will be further described herein. While testing, the test traffic generator 122 may generate traffic across the test topology 150. This traffic may be in the form of packets, frames, etc., and the behavior of the network elements 124-127 and the test topology 150 overall may be monitored throughout testing, and reports generated therefrom. The reports from the test traffic generator may contain statistics detailing the network operation at the various levels of the networking stack. This will include information concerning, for example, complete/incomplete/dropped Hypertext Transfer Protocol (HTTP) GET requests at the presentation level, good/missing/bad checksum packets and bytes at the layer two frame level. The API is able to query each of the simulated network elements to gather further information about where the network failure has occurred.

Figure 2:
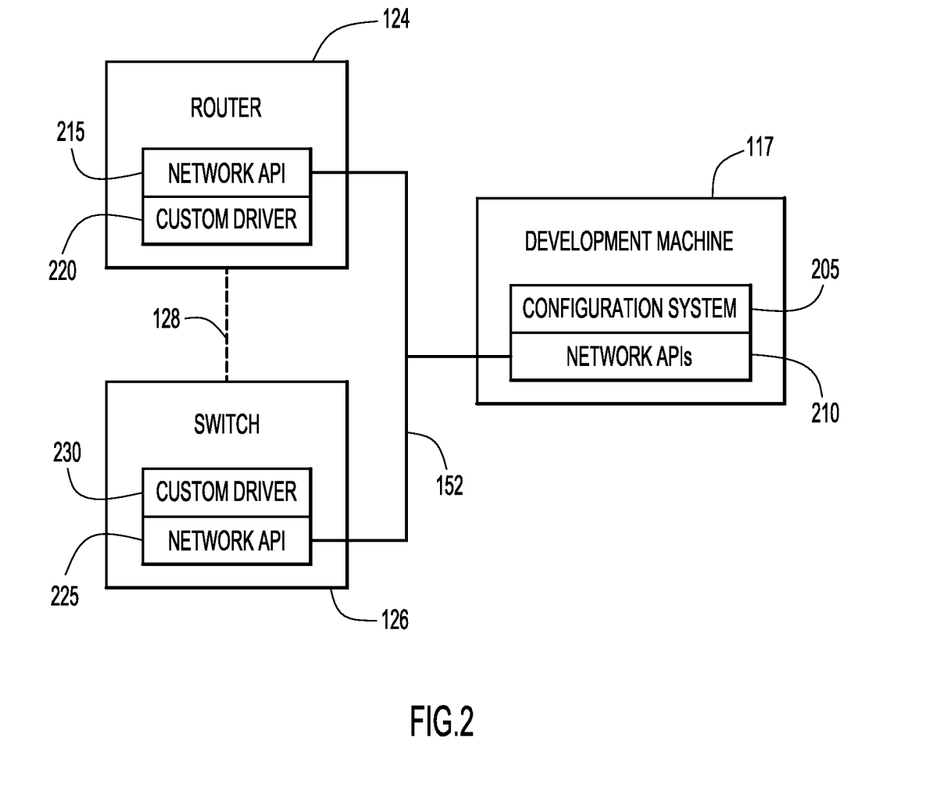
FIG. 2 is a block diagram illustrating an interface between the development environment and virtual network elements according to the techniques presented herein.

Turning now to FIG. 2, an example embodiment is shown that further illustrates how a network developer 130 may set up a test topology 150 containing network elements. For simplicity, FIG. 2 shows only two network elements, router 124 and switch 126. This is only an example. A network developer accesses the development machine 117. The development machine 117 includes a configuration system 205 and network APIs 210. The configuration system 205 is software that allows the network developer to create, configure and delete, etc., network elements and connections 128 between the network elements. Associated with each network element is a network API and a custom driver. For example, switch 124 includes a network API 215 and a custom driver 220, and router 126 includes a network API 225 and custom driver 230.

The development machine 117 forwards commands via APIs 210 across SDN control connections 152 to the APIs for each network element, in this example to network API 215 of router 124 and network API 225 of switch 126. The API commands may, for example, specify port connections between network devices. For example, the API commands may specify that a port on router 124 is forward to a port on switch 126, thus creating connection 128 of the test topology 150. The APIs thus form what could be called the "Orches-tration Layer," while the custom drivers 220, 230 and connections 128 form the "Packet Layer," by which the data is actually transferred.

As explained above, the network elements 124 and 126 are virtual, and the connection 128 is virtual as well, lacking any physical networking cable, because they are software images representing such physical elements. The network elements may be virtual machines executing software images, wherein the software images may include network operating systems. The network operating systems may be, for example, Cisco IOS (Internetwork Operating System), IOS XR, NX-OS, etc. The network operating systems may have device drivers. Device drivers are low-level software components that, in a physical network element, interact with ports and other hardware/physical devices. However, since the network elements 124-127 (FIG. 1) are virtual machines and the connections 128 of the test topology 150 are virtual, the custom drivers (e.g., customer drivers 220 and 230) are not in fact communicating with hardware devices. Rather, the custom drivers 220 and 230 are custom drivers that identically or substantially identically emulate the behavior of the physical layer (hardware layer) of a physical network device. Virtual machines acting as network elements may forward packets/frames to each other via this custom driver fabric. Due to this emulation, a network operating system executing on a network element does not "know" that there is no physical layer, or that it is running on a virtual machine. This is to say, the network operating system could be installed on a hardware router or hardware switch and behave identically to its behavior in the hosted test network portion 120. This fact is important to a network developer who may be customizing, extending and testing the network operating system for later use on physical (or virtual) routers and switches.

Figure 3:
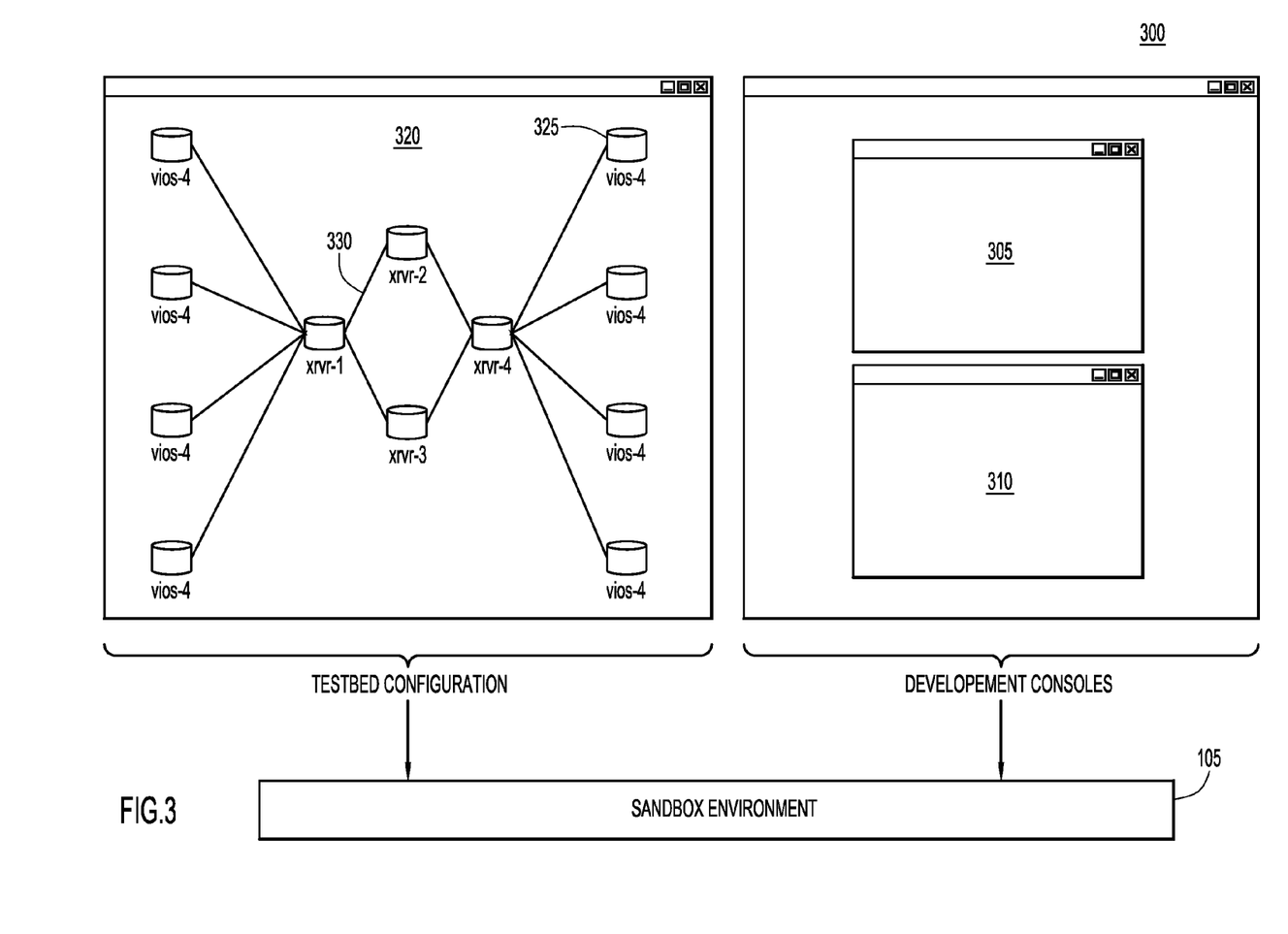
FIG. 3 is an example user interface allowing a network developer to access the testing environment and development environment, which may be co-hosted within a sandbox environment according to the techniques presented herein.

An example of the user interface that may be used, for example, by network developer 130 to develop a test topology 150 via development machine 117 is shown generally at reference numeral 300 in FIG. 3. The graphical user interface (GUI) 300 includes a development consoles 305 and 310 and a test topology window 320. Development consoles 305, 310 allow the network developer to define properties and characteristics of network elements in the test topology window 320. These development consoles 305, 310 may be terminal command prompts, or GUIs, etc. Commands are generated from the GUI 300 that are supplied to the cloud hosted sandbox environment 105 (FIG. 1). The test topology window 320 includes a plurality of network elements 325, along with connections 330 that define the test topology. Using this interface, a network developer or other user may design the layout for a test configuration of a network topology, execute network traffic via traffic generator 122 and view the test results.

One advantage of the setup of FIG. 3 is that the development and testing environments are made available for development and testing in a single interface via a single, unitary API, which has not been possible in previous network simulation techniques.

Figure 4:
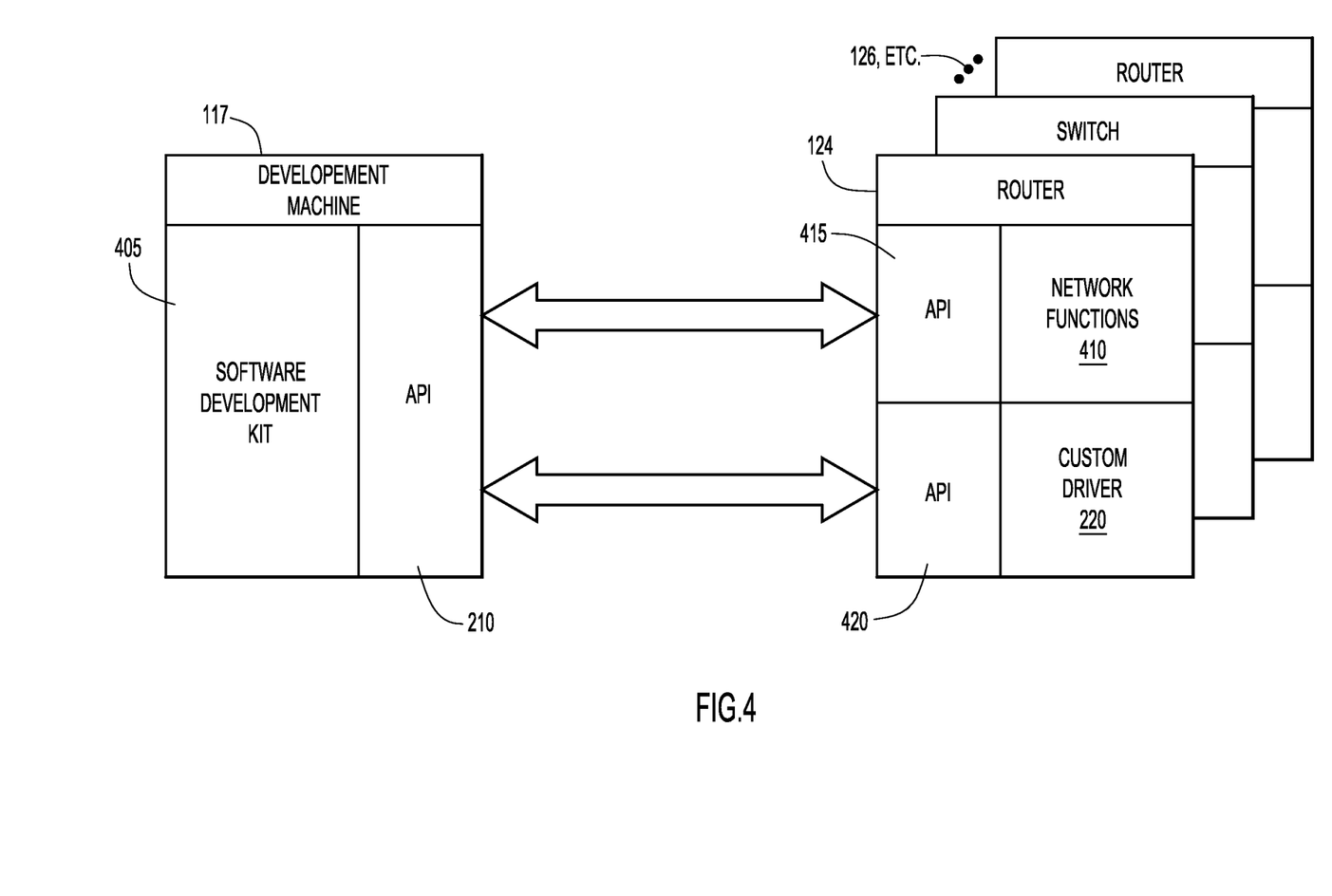
FIG. 4 is a simplified diagram showing an Application Programming Interface (API) between the development environment and virtual network elements.

FIG. 4 illustrates in more detail the interaction between the development machine 117 and the software representing the network elements. Associated with the development machine is a Software Development Kit (SDK) 405 to assist with networking development and testing. The SDK may use an API 210, i.e. the Orchestration Layer, which allows a network developer to perform network development and testing in one API. The API 210, or Orchestration Layer, may communicate first with network functions 410 via API 415. Such functions may designate what type of network operating system operates on the network element, e.g., network element 124, 126, etc., inside the virtual machine, as well other configuration settings. Other configuration settings may include parameters passed into the virtual machines which control the function of the operating system and thus the virtual machine itself. Through the custom driver APIs the virtual routers and switches can be connected in any arbitrary way. The topology is highly flexible and configurable through the customer driver API.

One advantage of using APIs to create, extend, configure and delete network elements and connections from a topology is that the topology may be left "up" or "online" during the dynamically made changes. In prior/existing network simulation/testing systems, network elements such as routers and switches in network simulations are merely software processes using static configuration files, typically lacking a routing stack. In order to change the behavior of the network elements, the network topology would have to be brought down in order to access and modify the static configuration files.

The API 210, or Orchestration Layer, may also communicate with a custom driver API 420 on each network element. The custom driver API 420 allows a network developer or other user to define connections between network elements.

Figure 5:
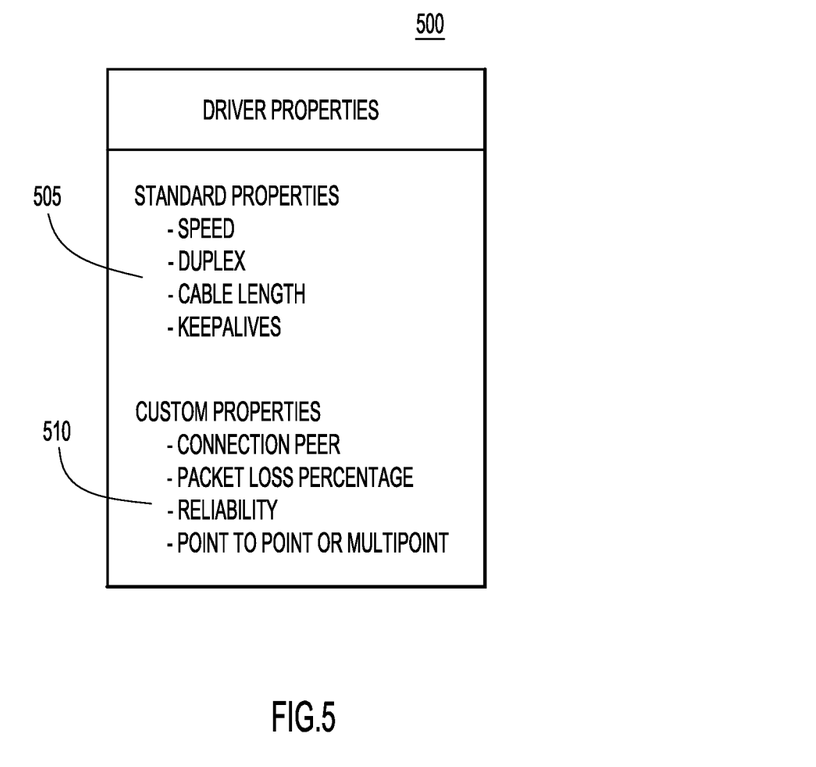
FIG. 5 is a block diagram illustrating standard and custom driver properties according to techniques presented herein.

Reference is now made to FIG. 5, which shows examples of properties of a custom driver. Properties 500 of the custom driver 220 (FIG. 4) include standard properties 505 found on typical hardware/physical network elements, and custom properties 510 which, among other things, help define the emulated physical layer. The standard properties 505 include the speed of the connection, and whether duplex communication is active on a given port, which allows bidirectional transmission between a network element and its link partner. The cable length on a given port may also be set. If the "keepalives" property is activated, a service will periodically check if there is a network connection, and reestablish it if necessary. Custom properties 510 may include a connection peer, which defines which network element is the link partner on a given port. The packet loss percentage may also be defined, which helps mimic real-world packet/frame data loss. The reliability of the connection may also be defined. The connection may also be defined as a point-to-point (one network element to another) connection or a point-to-multipoint (one network element to many or "broadcast communication topology") connection. The reliability custom property is a way of representing complete connectivity outage for that particular driver. For example, if the interface had a reliability of 50%, it would be expected that half the time the link would be down and unable to participate in the network topology.

Figure 6:
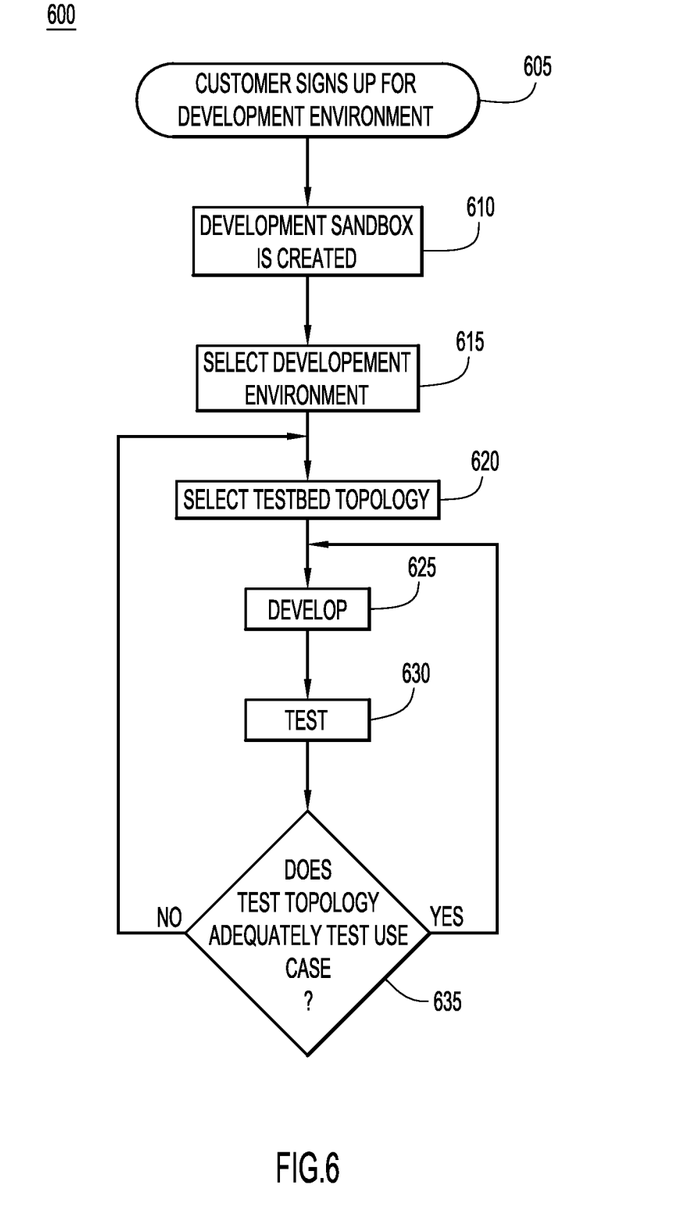
FIG. 6 is a flow chart depicting operations performed to set up a development and testing environment according to techniques presented herein.

A flowchart to provide an overview of the behavior of system 100 is now described with reference to FIG. 6. At 605, a customer or network developer logs in (signs up) for access to the development environment. The system 100 may then create a sandbox environment 105 at 610, which, as discussed previously, is typically a development and testing environment that is isolated from a production environment. The sandbox environment 105 is containerized, that is, private to the customer, i.e. there may be many sandbox environments (running simultaneously in the cloud) that are all isolated from each other. At 615, the network developer may then select a development environment, which may comprise selecting SDKs that are relevant to their development goals. The system 100 then creates the development environment with all the necessary tools and SDKs for the customer/user to develop their applications.

For example, the network developer may select a network operating system development SDK in order to customize a router, switch, or some other network element. The network developer may then begin using, for example, the user interface of FIG. 3, to develop a network topology for testing as depicted at steps 620 and 625. For example, at 620, the network developer creates a set of virtual routers and switches, in the test topology by programming the network level drivers with connectivity information. The test traffic generator may then generate traffic in the testing phase at 630. A variety of use cases may be tested at 635 to determine whether they adequately test the use case. If the topology does not adequately test a particular use case, the topology may need to be modified in some respects back at 620. If the topology does test a particular use case, other use cases may be tested until development and testing is complete.

Figure 7:
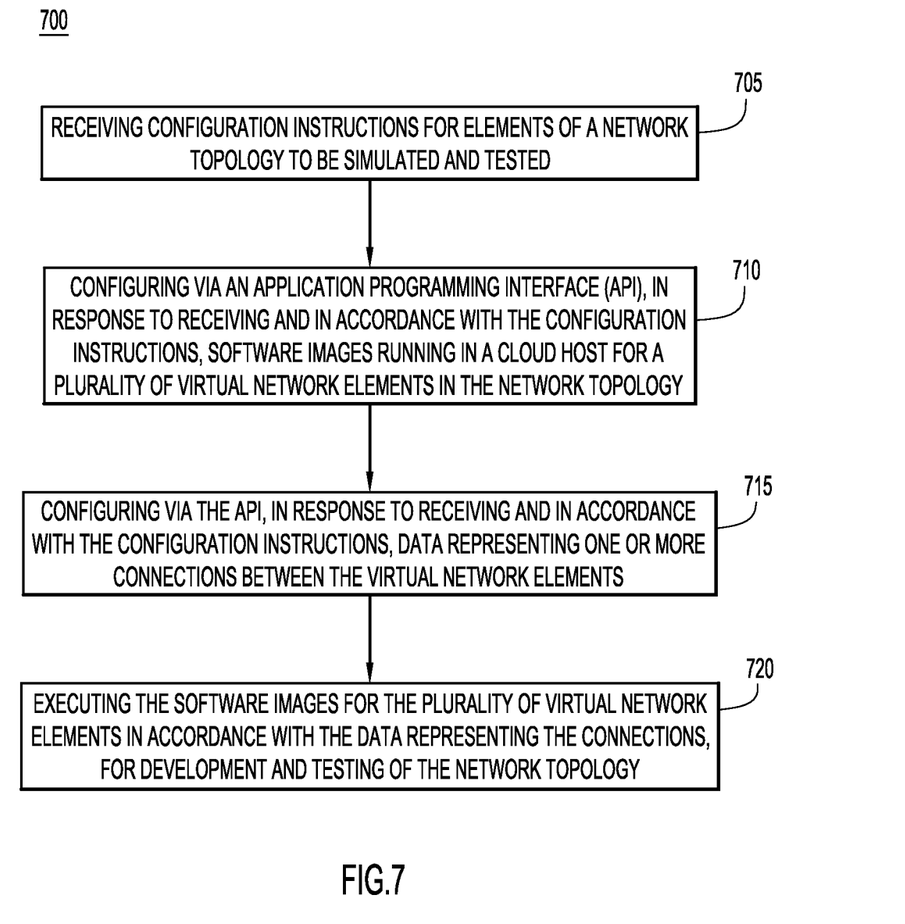
FIG. 7 is a flow chart depicting operations performed by the cloud-hosted testing and development environment according to techniques presented herein.

FIG. 7 is a flow chart providing a method 700 summarizing operations associated with the hosted sandbox development environment presented in connection with FIGS. 1-6. At 705, configuration instructions are received (for example, at a development machine) for elements of a network topology to be simulated and tested. The configuration instructions at 710 are then used to configure software images (which may be, for example, network operating systems executed on network elements in a cloud host) for network elements (which may be virtual) in a network topology. The configuration instructions, at 715, are also used to configure, via the API, data representing connections between network elements. At 720, the software images for the network elements are then executed, in accordance with data representing the connections, for development and testing of the topology. As explained above, the plurality of software images may be configured simultaneously with the executing of the plurality software images.

Figure 8:
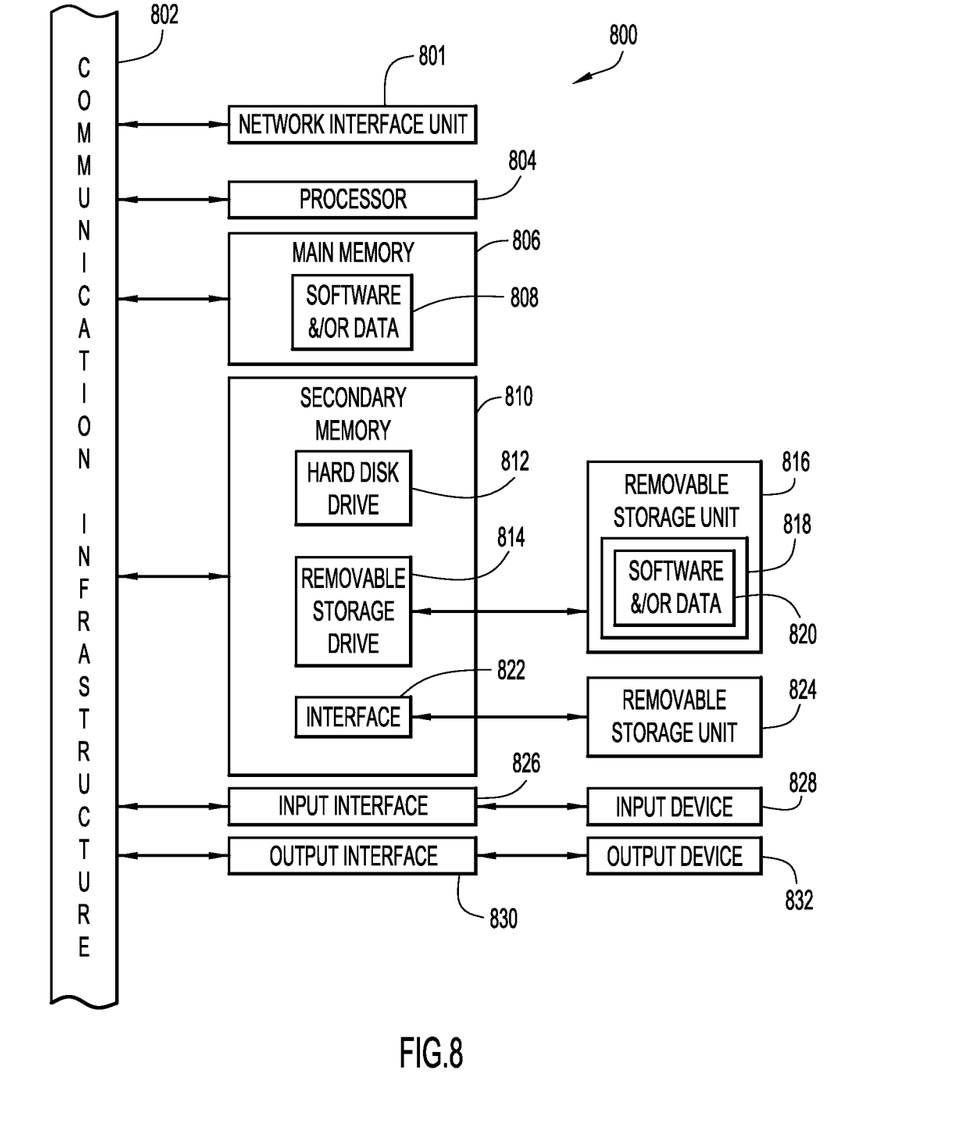
FIG. 8 is an example of a block diagram of a device configured to perform network development and testing according to techniques presented herein.

FIG. 8 shows a simplified block diagram of a computing device 800 configured to support the cloud hosted sandbox environment described herein in connection with FIGS. 1-7. The computing device 800 may take the form of a server residing in a cloud computing network and may communicate with a communication infrastructure 802 (e.g., wired or wireless networks). A network interface unit 801 is provided that enables network communications to a network (e.g., communication infrastructure 802) so that the computing device 800 can communicate with a network developer, etc. The computing device 800 includes a processor 804 that may take the form of a microprocessor or microcontroller that executes instructions stored in main memory 806 and/or secondary memory 810. Main memory 806 and secondary memory 810 may comprise read only memory (ROM), random access memory (RAM) that stores software (and data) 808, magnetic disk storage media devices 812, optical storage media devices, flash memory devices, electrical, optical, or other physical/tangible memory storage devices, such as removable storage-related devices and software 814, 816, 818, 820, 822 and 824. The input interface 826 is provided to interface user inputs from an input device 828 (e.g., keyboard, mouse, etc.), and the output interface 830 is provided to interface output to an output device 832 (e.g., display, audio speakers, etc.).

The software and/or data 808 may contain instructions that, when executed by the processor 804, cause the processor 804 to implement the operations presented herein in connection with FIGS. 1-7. Thus, in general, the memory 806, 810 may comprise one or more tangible (non-transitory) computer readable storage media (e.g., a memory device) encoded with software comprising computer executable instructions and when the software is executed (by the processor 804) it is operable to perform the operations described herein.

In summary, a method is provided comprising: receiving configuration instructions for elements of a network topology to be simulated and tested; configuring via an Application Programming Interface (API), in response to receiving and in accordance with the configuration instructions, a plurality of software images running in a cloud host for a plurality of virtual network elements in the network topology; configuring via the API, in response to receiving and in accordance with the configuration instructions, data representing one or more connections between the virtual network elements; and executing the plurality of software images for the plurality of virtual network elements in accordance with the data representing the connections, for development and testing of the network topology.

Further, an apparatus is provided comprising: a network interface unit configured to enable communications over a network; a processor coupled to the network interface unit, and configured to: receive configuration instructions for elements of a network topology to be simulated and tested; configure via an API, in response to receiving and in accordance with the configuration instructions, a plurality of software images for a plurality of virtual network elements in the network topology; configure via the API, in response to receiving and in accordance with the configuration instructions, data representing one or more connections between the virtual network elements; execute the plurality of software images for the plurality of virtual network elements in accordance with the data representing the connections, for development and testing of the network topology.

Further, a computer readable storage media is encoded which comprises computer executable instructions and when the software is executed operable to: receive configuration instructions for elements of a network topology to be simulated and tested; configure via an Application Programming Interface (API), in response to receiving and in accordance with the configuration instructions, a plurality of software images running in a cloud host for a plurality of virtual network elements in the network topology; configure via the API, in response to receiving and in accordance with the configuration instructions, data representing one or more connections between the virtual network elements; execute the plurality of software images for the plurality of virtual network elements in accordance with the data representing the connections, for development and testing of the network topology.

The techniques presented herein overcome deficiencies of prior systems in which network developers must use several different interfaces to configure virtual machines, define port configurations, set networking device parameters, run test traffic, etc. Furthermore, the system presented herein does not allow network developers access to underlying network element software images which could undermine the sale of licenses for virtual routers and switches, and associated libraries.

The above description is intended by way of example only.

What is claimed is:

1. A method comprising:
   receiving configuration instructions for elements of a network topology to be simulated and tested;
   configuring, in response to receiving and in accordance with the configuration instructions, a plurality of software images running in a cloud host for a plurality of virtual network elements in the network topology, each of the plurality of virtual network elements having a driver;
   configuring, in response to receiving and in accordance with the configuration instructions, the drivers of the plurality of virtual network elements with data representing one or more connections between the virtual network elements, the data representing the one or more connections including properties for a physical network element and properties for emulating behavior of the physical network element;
   generating test traffic for purposes of testing the network topology; and
   executing the plurality of software images for the plurality of virtual network elements in accordance with the data representing the connections and using the test traffic.

2. The method of claim 1, wherein configuring the plurality of software images is performed simultaneously with the executing of the plurality of software images.

3. The method of claim 1, wherein each software image executes in a virtual machine that emulates operation for a corresponding one of the plurality of virtual network elements, and wherein configuring the plurality of software images comprises dynamically configuring the plurality of software images.

4. The method of claim 3, wherein executing comprises executing each software image for each virtual machine designated in the configuration instructions, wherein each software image includes a network operating system that is deployable on a physical network element.

5. The method of claim 1, wherein configuring the drivers comprises sending the configuration instructions to the driver for each virtual network element.

6. The method of claim 1, wherein receiving configuration instructions comprises receiving user commands via a graphical user interface.

7. The method of claim 1, wherein executing comprises executing the plurality of software images so as to co-host in a sandbox environment the development of the network topology and the testing of the network topology.

8. An apparatus comprising:
   a network interface unit configured to enable communications over a network;
   a processor coupled to the network interface unit, and configured to:
   receive configuration instructions for elements of a network topology to be simulated and tested;
   configure, in response to receiving and in accordance with the configuration instructions, a plurality of software images running in a cloud host for a plurality of virtual network elements in the network topology, each of the plurality of virtual network elements having a driver;
   configure, in response to receiving and in accordance with the configuration instructions, the drivers of the plurality of virtual network elements with data representing one or more connections between the virtual network elements, the data representing the one or more connections including properties for a physical network element and properties for emulating behavior of the physical network element;
   generate test traffic for purposes of testing the network topology; and
   execute the plurality of software images for the plurality of virtual network elements in accordance with the data representing the connections and using the test traffic.

9. The apparatus of claim 8, wherein the processor is configured to configure the plurality of software images simultaneously with the executing of the plurality of software images.

10. The apparatus of claim 8, wherein each software image executes in a virtual machine that emulates operation for a corresponding one of the plurality of virtual network elements, and wherein the processor is configured to configure the plurality of software images by dynamically configuring the plurality of software images.

11. The apparatus of claim 10, wherein the processor is configured to execute by executing each software image for each virtual machine designated in the configuration instructions, wherein each software image is a network operating system that is deployable on a physical network element.

12. The apparatus of claim 8, wherein the processor is configured to configure the drivers by sending the configuration instructions to the driver for each virtual network element.

13. The apparatus of claim 8, wherein the processor is configured to receive the configuration instructions based on user commands entered via a graphical user interface.

14. The apparatus of claim 8, wherein the processor is configured to execute by executing the plurality of software images so as to co-host in a sandbox environment the development of the network topology and the testing of the network topology.

15. One or more non-transitory computer readable storage media encoded with software comprising computer executable instructions and when the software is executed operable to:
 receive configuration instructions for elements of a network topology to be simulated and tested;
 configure, in response to receiving and in accordance with the configuration instructions, a plurality of software images running in a cloud host for a plurality of virtual network elements in the network topology, each of the plurality of virtual network elements having a driver;
 configure, in response to receiving and in accordance with the configuration instructions, the drivers of the plurality of virtual network elements with data representing one or more connections between the virtual network elements, the data representing the one or more connections including properties for a physical network element and properties for emulating behavior of the physical network element;
 generate test traffic for purposes of testing the network topology; and
 execute the plurality of software images for the plurality of virtual network elements in accordance with the data representing the connections and using the test traffic.

16. The computer readable storage media of claim 15, wherein the instructions operable to configure comprise instructions operable to configure the plurality of software images simultaneously with the executing of the plurality of software images.

17. The computer readable storage media of claim 15, wherein each software image executes in a virtual machine that emulates operation for a corresponding one of each of the plurality of virtual network elements, and wherein the instructions operable to configure the plurality of software images comprise instructions operable to dynamically configure the plurality of software images.

18. The computer readable storage media of claim 17, wherein the instructions operable to execute comprise instructions operable to execute each software image for each virtual machine designated in the configuration instructions, wherein each software image is a network operating system that is deployable on a physical network element.

19. The computer readable storage media of claim 15, further comprising instructions operable to configure the drivers by sending the configuration instructions to the driver for each virtual network element.

20. The computer readable storage media of claim 15, further comprising instructions operable to receive the configuration instructions based on user commands entered via a graphical user interface.

* * * * *